Aug. 20, 1929.   E. A. BRADBURY ET AL   1,725,248
DIRECTION INDICATOR
Filed June 6, 1923   2 Sheets-Sheet 1

INVENTOR.
E. A. Bradbury
W. B. Holland
BY
ATTORNEYS.

Aug. 20, 1929.　　E. A. BRADBURY ET AL　　1,725,248
DIRECTION INDICATOR
Filed June 6, 1923　　2 Sheets-Sheet 2
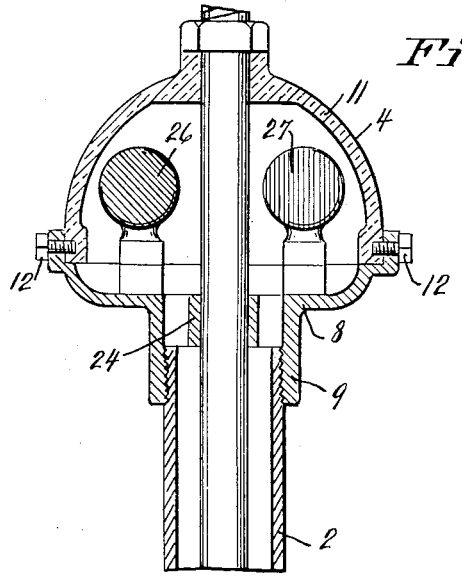
Fig.5.
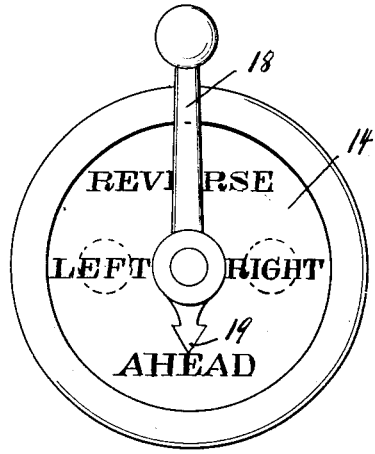
Fig.6.
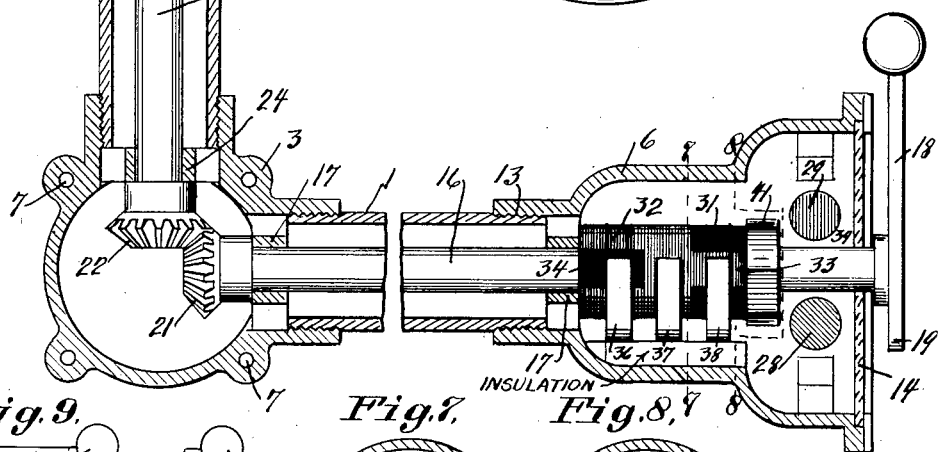
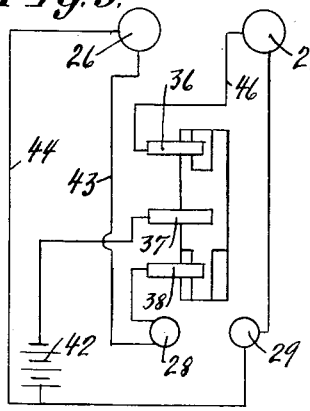
Fig.9.
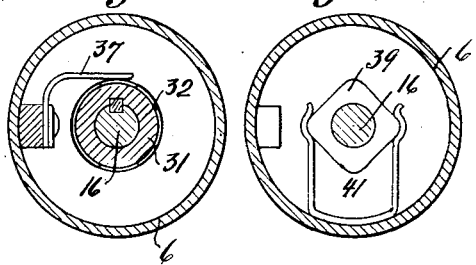
Fig.7.　Fig.8.
INVENTOR.
E. A. Bradbury
W. B. Holland
BY
ATTORNEYS.

Patented Aug. 20, 1929.

1,725,248

UNITED STATES PATENT OFFICE.

EUGENE A. BRADBURY, OF LONG BEACH, AND WILFORD B. HOLLAND, OF ANAHEIM, CALIFORNIA.

DIRECTION INDICATOR.

Application filed June 6, 1923. Serial No. 643,707.

The present invention relates to improvements in direction indicators for motor vehicles and the like, and its particular object is to provide an indicator of the character described that is simple in construction, convenient to handle, does not require any complicated working mechanism and may be readily secured to any type of motor vehicle. It is further proposed to provide a direction indicator that will not only inform the driver of another vehicle or a pedestrian of the intentions of the driver by means of a pointer, but also by means of light signals working in synchronism with the pointer and connected with their respective sources of power in such a manner as to become active automatically when the pointer is actuated. Other objects and advantages of our device will appear as the specification proceeds.

Figure 1:
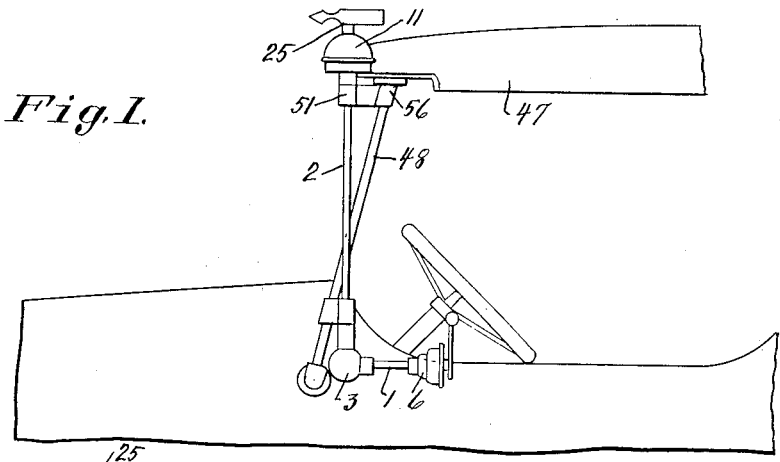
Figure 2:
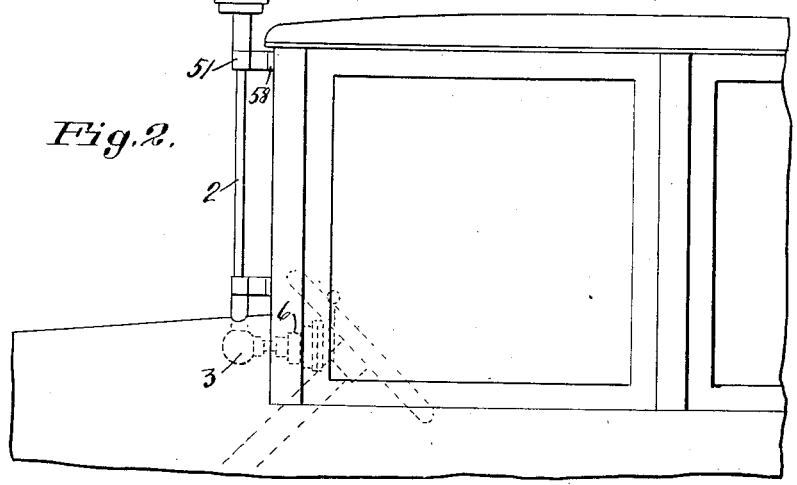
Figure 3:
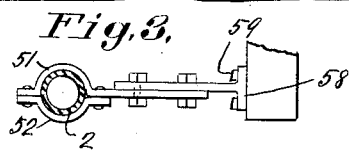
Figure 4:
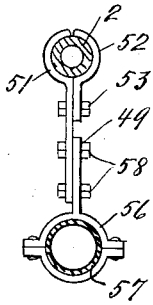

The preferred form of our device is illustrated in the accompanying drawing in which Figure 1 shows the device as attached to an opentop machine, Figure 2 the same device attached to a closed car, Figure 3 a detail view of a bracket used in the latter case for securing the indicating device, Figure 4 a bracket used in the connection shown in Figure 1, Figure 5 a vertical section through the indicating device, Figure 6 a rear view of a handle manipulated by the operator of the car moving over a dial, Figure 7 a transverse section taken along line 7—7 of Figure 5, Figure 8 a transverse section taken along line 8—8 of Figure 5, and Figure 9 a wiring diagram showing the connections for the electrical circuits. While we have shown only the preferred form of the invention, we wish to have it understood that various changes or modifications may be made within the scope of the claims hereto attached without departing from the spirit of the invention.

The housing of our device comprises preferably a horizontal tube (1), a vertical tube (2), a transmission box (3) joining the two tubes, a globe (4) at the upper end of the vertical tube, and a switch box (6) at the end of the lower tube. The transmission box is preferably made in two halves which may be bolted together through registering perforations (7). The tubes (1) and (2) are threaded into the transmission box. The globe (4) comprises a lower half (8) threadedly engaging the vertical tube as shown at (9) and a transparent bulb (11) supported thereon and held in place by means of screws (12). The switch box (6) is threaded to the end of the horizontal tube as shown at (13) and is disposed on the car in such a manner that its transparent face (14) is within convenient sight of the operator. The face is marked as shown in Figure 6 with the words Ahead, Reverse, Left and Right.

A horizontal shaft (16) is supported in bearings (17) in the tube (1) and extends with its rear end through the transparent plate (14), a handle (18) being secured thereto and terminating in a pointer (19). The other end of the shaft (16) is provided with a bevel gear (21) at its front end which meshes with the bevel gear (22) on a vertical shaft (23) supported in bearings (24) in the vertical tube (2). The upper end of the vertical shaft has an indicating device such as the pointer (25) attached thereto. Within the globe we provide two lights (26) and (27), the former being preferably made of green glass, while the latter is made red. Corresponding lights (28) and (29) are supported in the switch box (6). Within the latter box we provide a fiber drum (31) having a copper ring (32) thereon which latter is provided with a projection (33) extending over a portion of the fibre drum, while a cutout (34) in the copper ring exposes a corresponding portion of the fibre drum on the opposite side of the projection (33). Three contact members (36), (37) and (38) are in continuous engagement with the drum (31) in such a manner that the central contact member (37) is always in engagement with the copper ring, while of the contact members (36) and (38) only one is in engagement with the copper at one time, while the other contact member bears on the fibre or insulating material at that time. Near the fibre drum we provide a collar (39) of angular cross section as shown in Figure 8 which is engaged by a U-shaped spring (41) for holding the horizontal shaft in a certain position.

The operation of our indicating device is as follows: As long as the driver goes straight ahead, the handle (18) is in the position shown in Figure 6. At the same time, both of the green lights (26) and (28) are burning, as will appear from the wiring diagram of Figure 9, the current flowing from the source of energy (42)

through the central contact member (37), the contact member (38), the light (28), the wire (43) the light (26) and back to the source of energy through the wire (44). When the operator intends to turn to the left or right, he moves the handle (18) in the proper position which will cause the pointer (25) at the end of the shaft (23) to turn either to the right or to the left, while at the same time, the contact between the contact member (38) and the copper ring on the fibre drum is broken, while a contact is established between the contact member (36) and the copper ring which will cause the red lights to be energized as will appear from the wiring diagram. The current now flows from the source of energy (42) through the contact member (37), the contact member (36), the wire (46), the lights (27) and (29) and back to the source of energy.

The device may be secured to the motor vehicle in any suitable manner according to the make of the same. If the machine is constructed as in Figure 1 with a top (47) projecting over the driver's seat and a wind shield supported in two uprights (48), the bracket (49) shown in Figure 4 may be employed. It comprises two semi-circular members (51) and (52) adapted to be clamped on the tube (2) by means of a bolt (53) and a clamping arrangement (56) adapted to engage the upright (57) with bolts (58) connecting the clamping arrangement (56) to an extension of the member (51). If a closed car is used such as is shown in Figure 2, the attachment shown in Figure 3 may be employed in which a plate (58) adapted to be bolted as shown at (59) to the front of the body of the machine is substituted for the clamping arrangement (56).

We claim:

In a direction indicator, an L-shaped casing having one end disposed adjacent to the driver's compartment and its other end projecting above the top of the automobile, a transparent plate covering the first mentioned end and a transparent bulb covering the other end, a handle disposed adjacent to said plate and a direction indicating arrow located above said bulb, means operatively connecting said arrow and said handle, comprising geared shafts housed in said L-shaped casing, colored direction indicating lamps disposed in said bulb and pilot lamps disposed back of said plate, and a switch actuated by said handle for simultaneously closing a circuit to corresponding lamps for causing the plate and bulb to be illuminated when the arrow is moved.

EUGENE A. BRADBURY.
WILFORD B. HOLLAND.